US011211993B2

(12) United States Patent
Kurras et al.

(10) Patent No.: US 11,211,993 B2
(45) Date of Patent: Dec. 28, 2021

(54) COMMUNICATION APPARATUS, METHOD AND CELLULAR NETWORK USABLE IN A LOCALIZATION OF A USER EQUIPMENT USING A PHASE ESTIMATE

(71) Applicant: Fraunhofer-Gesellschaft zur Förderung der angewandten Forschung e.V., Munich (DE)

(72) Inventors: Martin Kurras, Berlin (DE); Norbert Franke, Erlangen (DE); Mohammad Alawieh, Nuremberg (DE); Benjamin Sackenreuter, Buckenhof (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 16/814,370

(22) Filed: Mar. 10, 2020

(65) Prior Publication Data

US 2020/0212990 A1 Jul. 2, 2020

Related U.S. Application Data

(63) Continuation of application No. PCT/EP2018/074969, filed on Sep. 14, 2018.

(30) Foreign Application Priority Data

Sep. 15, 2017 (EP) .................................. 17191273

(51) Int. Cl.
*H04B 7/08* (2006.01)
*G01S 5/00* (2006.01)
(Continued)

(52) U.S. Cl.
CPC ............ *H04B 7/086* (2013.01); *G01S 5/0036* (2013.01); *H04L 5/0051* (2013.01); *H04L 27/2613* (2013.01); *H04W 64/003* (2013.01)

(58) Field of Classification Search
CPC ..... H04B 7/086; G01S 5/0036; H04L 5/0051; H04L 27/2613; H04W 64/003
See application file for complete search history.

(56) References Cited

U.S. PATENT DOCUMENTS 5,173,710 A * 12/1992 Kelley .................. G01S 5/0009
342/463
9,699,607 B2 7/2017 Markhovsky et al.
(Continued)

FOREIGN PATENT DOCUMENTS

WO 2010/104451 A1 9/2010
WO 2015/116322 A1 8/2015
(Continued)

OTHER PUBLICATIONS

S. Fischer: "Observed Time Difference Of Arrival (OTDOA) positioning in 3GPP LTE", Qualcomm White Pap, vol. 1, pp. 1-62, Jun. 2014.
(Continued)

*Primary Examiner* — Dinh Nguyen
(74) *Attorney, Agent, or Firm* — McClure, Qualey & Rodack, LLP

(57) ABSTRACT

Communication apparatus of a cellular communication network, wherein the apparatus is configured to receive a reference signal; and to estimate a phase estimate based on the received reference signal; and to provide a localization module with the phase estimate.

29 Claims, 7 Drawing Sheets

(51) Int. Cl.
*H04L 5/00* (2006.01)
*H04L 27/26* (2006.01)
*H04W 64/00* (2009.01)

(56) References Cited

U.S. PATENT DOCUMENTS

| | | | |
|---|---|---|---|
| 10,324,162 B2 | 6/2019 | Morioka | |
| 2005/0163234 A1* | 7/2005 | Taleb | H04L 63/1441 375/259 |
| 2005/0227706 A1 | 10/2005 | Syrjarinne | |
| 2006/0009235 A1* | 1/2006 | Sheynblat | G01S 19/48 455/456.1 |
| 2008/0200187 A1* | 8/2008 | Lin | G01S 5/02 455/456.6 |
| 2009/0052563 A1* | 2/2009 | Kim | H04L 1/0045 375/260 |
| 2011/0018766 A1* | 1/2011 | Steer | G01S 5/04 342/368 |
| 2011/0312339 A1 | 12/2011 | Kuningas et al. | |
| 2011/0316748 A1* | 12/2011 | Meyer | G01S 5/0247 342/451 |
| 2012/0088518 A1* | 4/2012 | Edge | H04W 64/00 455/456.1 |
| 2013/0010744 A1* | 1/2013 | Kang | H04B 7/0623 370/329 |
| 2014/0221005 A1 | 8/2014 | Marshall et al. | |
| 2015/0133173 A1* | 5/2015 | Edge | G01S 1/66 455/456.6 |
| 2018/0017661 A1* | 1/2018 | Morioka | G01S 5/08 |
| 2018/0048366 A1* | 2/2018 | Sundararajan | H04B 17/345 |
| 2019/0346554 A1* | 11/2019 | Park | G06K 7/10366 |
| 2020/0128357 A1* | 4/2020 | Kim | H04W 64/00 |

FOREIGN PATENT DOCUMENTS

| | | |
|---|---|---|
| WO | 2016/131613 A1 | 8/2016 |
| WO | 2019/053228 A1 | 3/2019 |

OTHER PUBLICATIONS

"3rd Generation Partnership Project; Technical Specification Group Radio Access Network; Evolved Universal Terrestrial Radio Access (E-UTRA); LTE Positioning Protocol (LPP) (Release 13)"; Mar. 2016 (Mar. 2016).

"3rd Generation Partnership Project;Technical Specification Group Radio Access Network; Evolved Universal Terrestrial Radio Access (E-UTRA);Physical channels and modulation (Release 13)"; Dec. 2015 (Dec. 2015).

P. Misra, P. Enge: "GPS Measurements, and Error Sources", (Revised Second Edition) Ganga-Jamuna Press, 2010 (relevant pages attached), pp. 149, 151, 153, 155.

G. Giorgi and P. J. G. Teunissen: "Carrier phase GNSS attitude determination with the Multivariate Constrained LAMBDA method," 2010 IEEE Aerospace Conference, Big Sky, MT, 2010, pp. 1-12.

"3rd Generation Partnership Project; Technical Specification Group Radio Access Network; Evolved Universal Terrestrial Radio Access (E-UTRA); LTE Positioning Protocol (LPP) (Release 13)"; Dec. 2016 (Dec. 20, 2016).

T. von der Grün, N. Franke, D. Wolf, N. Witt and A. Eidloth: "A real-time tracking system for football match and training analysis," in Microelectronic systems, Springer, 2011, pp. 199-212.

PCT International Search Report and Written Opinion of PCT/EP2018/074969 (dated Sep. 14, 2018).

* cited by examiner

COMMUNICATION APPARATUS, METHOD AND CELLULAR NETWORK USABLE IN A LOCALIZATION OF A USER EQUIPMENT USING A PHASE ESTIMATE

CROSS-REFERENCE TO RELATED APPLICATIONS

This application is a continuation of copending International Application No. PCT/EP2018/074969, filed Sep. 14, 2018, which is incorporated herein by reference in its entirety, and additionally claims priority from European Applications Nos. EP 17191273.6, filed Sep. 15, 2017, which is also incorporated herein by reference in its entirety.

Embodiments of the present invention describe apparatuses, methods and cellular networks usable for localization of a user equipment using a phase estimate.

BACKGROUND OF THE INVENTION

In LTE network, localization is based on Positioning Reference Sequences (PRS) sequences transmitted in the PDSCH, see [1][4].

Other data can be used, e.g. DoA (Direction of Arrival) measurement. Drawbacks are:
Multiple antennas needed
Calibrated array (including HF-hardware)
Timing Advance, Observed Time Difference of Arrival (ODToA), Uplink Time Difference of Arrival UDToA based positioning are currently limited by
  TOA (Time of Arrival) resolution that depends on the associated signal bandwidth. The PRS can currently utilize up to a 10 MHz Bandwidth in OTDOA mode. High accuracy (<1 m) is not achievable if positioning solely depends the TOA measurements [5]
  LTE reports RSTD (Reference Signal Time Difference) measurements which are based on the difference between the TOA of the reference BS (Base station) and the other BSs. The highest RSTD resolution reporting is set to 0.5*Ts which is equivalent to around 16.32 ns [1].
  Synchronization between base station (TDoA systems) or BS and UE (User Equipment)

Therefore, accuracies in the range of 1 m can't be achieved.

In view of the above, there exists a desire for an improved concept to localize user mobile devices, e.g. with a higher precision.

SUMMARY

An embodiment may have a communication apparatus of a cellular communication network, wherein the apparatus is configured to receive a reference signal; wherein the apparatus is configured to estimate a phase estimate based on the received reference signal; and wherein the apparatus is configured to provide a localization module with the phase estimate.

According to another embodiment, a cellular network may have: an inventive communication apparatus, and the localization module.

According to another embodiment, a localization method may have the steps of: receiving a reference signal; estimating a phase estimate based on the received reference signal; and providing a localization module with the phase estimate.

Another embodiment may have a non-transitory digital storage medium having a computer program stored thereon to perform the localization method, the method having the steps of: receiving a reference signal; estimating a phase estimate based on the received reference signal; and providing a localization module with the phase estimate, when said computer program is run by a computer.

An embodiment provides a communication apparatus of a cellular communication network. The communication apparatus is configured to receive a reference signal, to estimate a phase estimate based on the received reference signal and to provide a (time difference of arrival (TDOA), time of arrival (TOA) or angle of arrival (AOA) based) localization module with the phase estimate.

The described embodiment is based on the idea that a localization using a phase estimate (e.g. a carrier phase measurement or a phase difference measurement) can provide a higher precision for localization. In other words, using a phase-based localization can achieve a better localization result compared to only using time measurements for localization. Moreover, usage of a phase-based estimation in a mobile communication apparatus is especially useful e.g. for precise localization of people in emergency situations. For example, in natural disaster areas it is of paramount importance to be able to localize and rescue people fast.

In embodiments, the communication apparatus may be part of a user equipment of the cellular communication network. Having the communication apparatus may enable localization by the user equipment itself, which in turn may communicate its location to a base station.

In embodiments, the communication apparatus may comprise the localization module, and wherein the localization module is configured to determine a position of the user equipment. The described embodiment allows for an independent localization of the user equipment without the need of computational resources of a base station or the cellular network (aside from reception of the reference signal).

In embodiments, the communication apparatus may be configured to transmit a phase estimate capability flag to a base station, wherein the phase estimate capability flag indicates that the communication apparatus is capable of performing a phase estimate. The described embodiment can communicate to a base station or the cellular network that it is able to perform phase measurement, such that a high precision localization based in the phase estimate can be performed.

In embodiments, the communication apparatus may be configured to communicate via a base station of the cellular communication network the phase estimate to the localization module for use in determination of the position of the user equipment. The described embodiment allows for the localization to be performed outside of the user equipment although performing the phase estimation in the user equipment. Thereby, the described embodiment allows for flexible task assignment.

In embodiments the communication apparatus may be configured to transmit antenna port information of the communication apparatus to a base station, wherein the antenna port information indicates which antenna is used to receive the reference signal. Knowledge about which antenna can be useful e.g. in MIMO setting where multiple antennas are located close to each other. However, small distances between the antennas lead to large phase differences, due to a comparably small wavelength.

In embodiments, the communication apparatus may be configured to receive a plurality of reference signals from a plurality of transmitters, to estimate a plurality of phase estimates from the plurality of reference signals and to receive from the plurality of transmitters synchronicity information indicating a measure of synchronicity among the plurality of transmitters. Moreover, the communication apparatus may be configured to, if the synchronicity measure fulfills a predetermined criterion, perform the estimation and provide the plurality of phase estimates to the localization module, or if the synchronicity measure does not fulfill the predetermined criterion, refrain from at least the providing the plurality of phase estimates to the localization module. The described embodiment can flexibly decide if received reference signals may be useful in a localization based on the phase estimate, e.g. if the transmitters are transmitting sufficiently synchronous for phase-based localization. Moreover, the transmitters may have a common clock source to achieve synchronization.

In embodiments, the communication apparatus may be configured to derive a plurality of time measurements from the reference signals or further reference signals from the plurality of transmitters and to provide the plurality of time measurements in addition to the plurality of phase estimates to the localization module if the synchronicity measure fulfills the predetermined criterion. Alternatively, the communication apparatus may be configured to provide the plurality of time measurements to the localization module if the synchronicity measure does not fulfill the predetermined criterion. The described embodiments can beneficial combine time measurements (e.g. using a cross correlation) and phase estimate to obtain a precise location estimate of the user equipment, for example, more precise than using phase estimate or time measurements alone for localization. Moreover, the transmitters may have a common clock source to achieve synchronization.

In embodiments, the communication apparatus may be configured to determine a quality measure according to a first mode and to accompany the plurality of phase estimates and the time measurement with the quality measure if the synchronicity measure fulfills the predetermined criterion. Alternatively, the communication apparatus may be configured to determine the quality measure according to a second mode differing from the first mode and to accompany the plurality of time measurements with the quality measure if the synchronicity measure does not fulfill the predetermined criterion. The described embodiment can indicate a quality of the received reference signals, wherein a low quality may not be useable for localization using phase estimates. In other words, having bad quality phase estimates, e.g. due to multipath propagation, the localization can be performed more precisely using only the time measurements.

In embodiments, the localization module may be configured to selectively enable phase estimate-based localization if two or more reference signals are received from a number of synchronized transmission points (e.g. eNBs (eNodeBs) or RRHs (remote radio heads)). If the transmission are sufficiently well-synchronized the reference signals received therefrom can be easily used for precise localization of a UE. Moreover, the transmitters may have a common clock source to achieve synchronization.

In embodiments, the communication apparatus may be part of a base station of the cellular communication network and the communication apparatus may be configured to receive the reference signal from a user equipment of the cellular communication network. The described embodiment allows for performing the entire localization in the base station or on a server connected to the cellular network. In other words, a mobile device or user equipment may send a reference signal which may be received at multiple base stations, which may cooperatively be able to localize the mobile device or user equipment.

In embodiments, the communication apparatus may comprise the localization module, and the localization module may be configured to determine a position of the user equipment using the phase estimate. Alternatively, the localization module may reside outside of the communication apparatus and the communication apparatus may be configured to communicate the phase estimate to the localization module for use in the determination of the position of the user equipment. The described embodiment allows for flexible assignment of computational tasks, depending on where the localization module resides.

In embodiment, the user equipment may comprise the localization module, and the communication apparatus may be configured to provide the localization module of the user equipment with the phase estimate for use in the determination of the position of the user equipment. Thereby, the described embodiment allows for a high degree of flexibility, where the localization is performed.

In embodiments, the communication apparatus may be configured to receive antenna port information, wherein the antenna port information indicates from which antenna of transmitter the reference signal is transmitted. Having information about a used antenna can be used for precise localization, as transmitters may have multiple antennas which may be slightly distanced, resulting in a large phase difference.

In embodiments, the communication apparatus may be configured to receive a second reference signal, to estimate a second phase estimate based on the second reference signal and to provide the localization module with the second phase estimate. Having a higher number of phase estimates may be useful to obtain a more precise localization.

In embodiments, the second reference signal may be transmitted from a different transmitter than the reference signal; thereby, a second pseudorange or relative distance may be obtained useful for triangulation.

In embodiments, the apparatus may be configured to estimate a time measurement (e.g. useful for TDOA or TOA) based on the received reference signal and to provide the localization module with the time measurement. Further, the localization module may be configured to determine a position using the phase estimate and the time measurement. Using a combination of time measurement and phase estimate allows to enable a more precise localization than using either one individually.

In embodiments, the localization module may be configured to determine the position by combining at least one of time difference of arrival (TDOA) measurement, time of arrival (TOA) measurement and angle of arrival (AoA) measurement with the phase estimate. The described embodiment allows for combining various time or angle based approaches with a phase estimate to achieve localization.

In embodiments, the communication apparatus may be configured to receive a plurality of reference signals from a plurality of transmitters, to estimate a plurality of phase estimates from the plurality of reference signals and to derive a plurality of time measurements from the reference signals or further reference signals from the plurality of transmitters. Moreover, the communication apparatus may be configured to provide the plurality of time measurements in addition to the plurality of phase estimates to the localization module, to determine a first quality measure indicating a quality of the plurality of phase estimates and a second quality measure indicating a quality of the plurality of time measurements and to accompany the plurality of phase estimates and time measurements with the first and second quality measures. The described embodiment allows for a localization to rely on the time measurements or phase estimates depending on their reliability, e.g. measurements or estimates with high quality over those with worse quality to perform a more precise localization.

In embodiments, the communication apparatus may be configured to receive a plurality of reference signals from a plurality of transmitters, to estimate a plurality of phase estimates from the plurality of reference signals, to derive a plurality of time measurements from the reference signals or further reference signals from the plurality of transmitters and to provide the plurality of time measurements in addition to the plurality of phase estimates to the localization module. Further, the localization module may be configured to determine the position by applying the plurality of phase estimates as phase differences between pairs of the plurality of transmitters. Using phase differences allows for a smoothed result, such that big outlier may be avoided which may be due to estimation errors or ambiguity problems.

In embodiments, the communication apparatus may be configured to receive observed time difference of arrival assistance data associated with a reference signal configuration. Thereby, the communication apparatus can, for example, be informed about which kind of reference signals are used, which antenna port is used for transmission of the reference signal or which time-frequency arrangement is used, i.e. at in which time slot and/or at which frequency slot the reference signal is send. Moreover, integration in existing systems may be simplified, which may already use an observed time difference of arrival based method.

In embodiments, the communication apparatus may be configured to determine a measure indicating as to how strong the received reference signal is subject to multipath propagation, wherein the communication apparatus is configured to accompany the phase estimate with the multipath measure. Having knowledge about multipath propagation of the received signal can be a strong indicator of reliability of the phase estimate for localization. Moreover, in context of phase estimation multipath propagation may have a stronger detrimental effect than, for example, in time measurements.

In embodiments, the apparatus may be configured to estimate the phase estimate using a prediction of the phase estimate, wherein the prediction is based on previously estimated phase estimates. Using prediction of the phase estimate, e.g. based on previously estimated phase estimated, allows for compensating of large outliers which may be due to measurement errors.

In embodiments, the communication apparatus may be configured to transmit a quality indicator to a base station, wherein the quality indicator describes a quality of the phase estimate. Having a quality indicator of the estimate allows the apparatus to decide whether to use the phase estimate for localization or instead provide the localization with other data, e.g. time measurements, for localization.

In embodiments, the communication apparatus may be configured to provide a phase difference estimate based on a previous phase estimate and the received reference signal. Using a phase difference may reduce errors due to phase ambiguities.

In embodiments, the communication apparatus may be configured to provide observed time difference of arrival (OTDOA) location information elements, wherein the OTDOA location information elements comprise the phase estimate, and/or antenna port information, and/or a quality indicator, and/or a time measurement. The described embodiment allows combining the described element as OTDOA location information elements.

In embodiments, the communication apparatus may be configured to estimate the phase estimate based on a complex-valued correlation of the received reference signal, if no multipath propagation has been detected. In other words, an angle of a complex-valued correlation value can be translated to the phase estimate.

Embodiments provide a cellular network comprising a Communication apparatus according to one of the herein described embodiments, and the localization module.

Embodiments provide a localization method, e.g. for use in a cellular network, comprising receiving a reference signal, estimating a phase estimate based on the received reference signal and providing a localization module with the phase estimate.

The described method can be supplemented either individually or in combination by any features or functionalities described herein with respect to the apparatuses.

An embodiment provides for a computer program with a program code for performing the method on a computer or a microcontroller.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
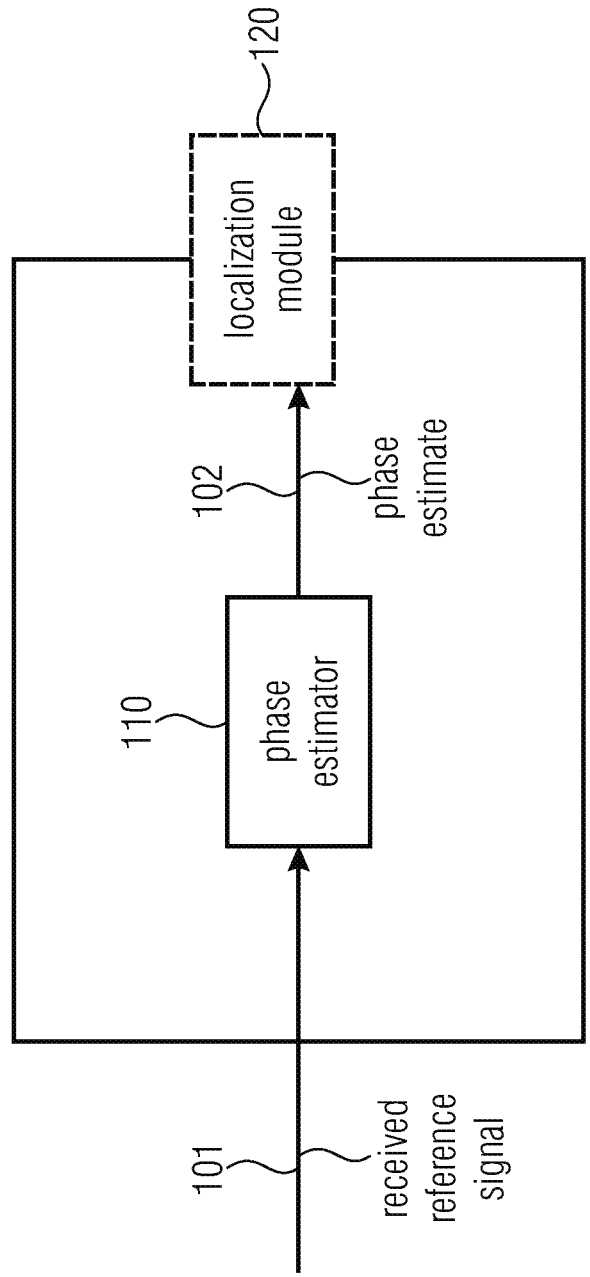
FIG. 1 shows a schematic block diagram of a communication apparatus according to embodiments of the of the invention.

FIG. 1 shows a schematic block diagram of a communication apparatus 100 according to embodiments of the invention. The apparatus 100 comprises a phase estimator 110 and may optionally comprise a localization module 120 which may reside within the communication apparatus 100 but may also be residing outside of the communication apparatus 100.

The communication apparatus 100 may be part of a cellular communication network and may be configured to receive a reference signal 101. Based on the reference signal 101 the apparatus may be configured to estimate a phase estimate 102. Further, the apparatus may be configured to provide a (e.g. TDOA-, TOA- or AOA-based) localization module 120 with the phase estimate 102.

Further features and functionalities of the communication apparatus 100 will be described in more detail with the following embodiments. Further, same reference signs identify identical or similar functionalities. The described embodiment can be supplemented either individually or in combination by any features or functionalities described herein with respect to following embodiments.

Figure 2:
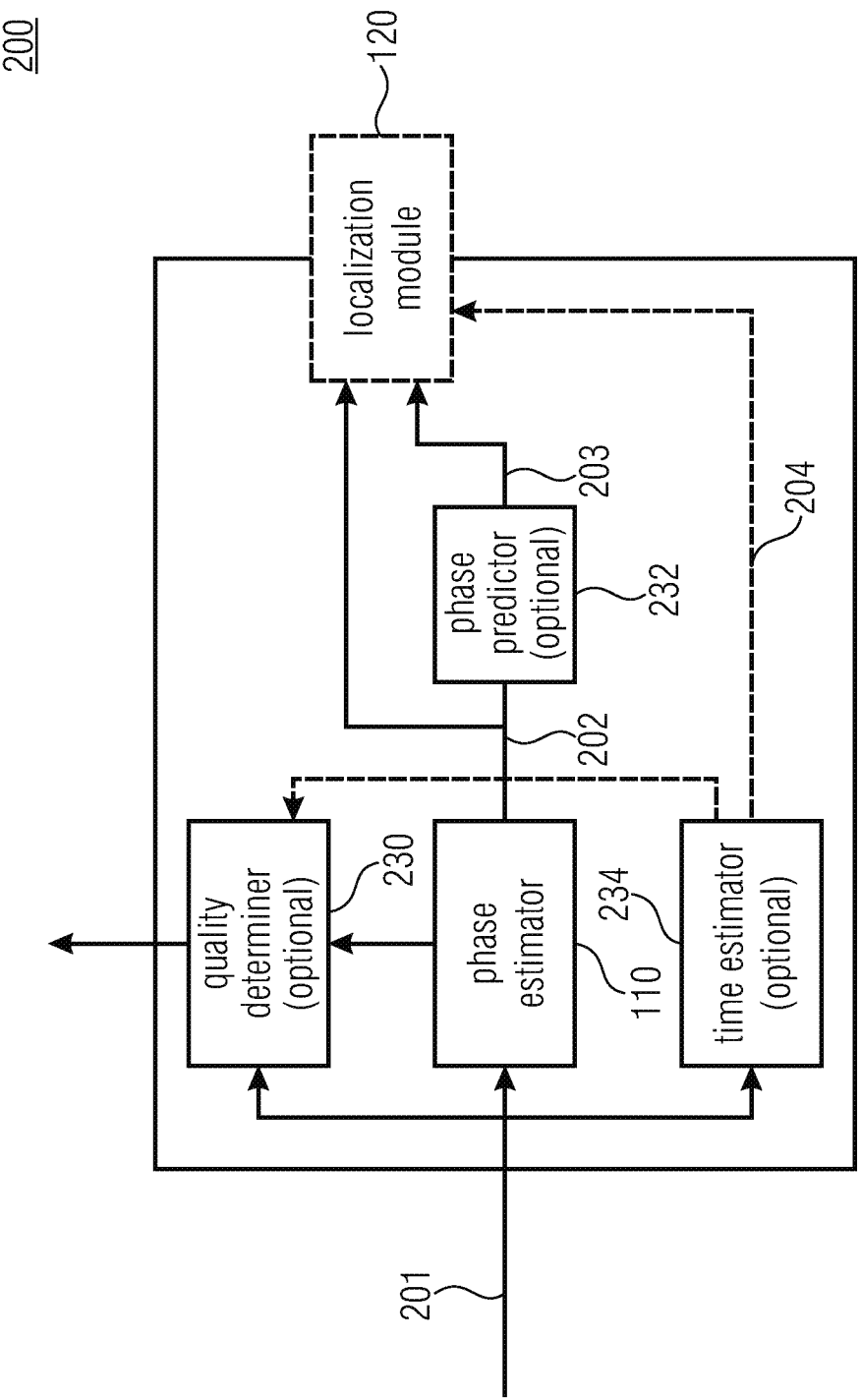
FIG. 2 shows a schematic block diagram of a communication apparatus according to embodiments of the invention.

FIG. 2 shows a schematic block diagram of a communication apparatus 200 according to embodiments of the invention. The apparatus 200 comprises a phase estimator 110, an optional quality determiner 230, an optional phase predictor 232, an optional time estimator 234 and a localization module 120. The localization module may also be located outside of apparatus 200, e.g. on a server of the cellular network or in the base station.

The communication apparatus 200 is provided with a received reference signal 201 wherefrom the phase estimator 110 derives a phase estimate 202. The phase estimate 202 can either be provided directly to the localization module 120 or it may be provided to the phase predictor 232 which may perform a prediction of the phase. The localization module 120 can also be provided with the predicted phase estimate 203. Moreover, the reference signal 201 may also be provided to the time estimator 234 which can obtain time measurements e.g. using a correlation (TOA, TDOA). The time estimator 234 may provide the localization module 120 with a time measurement 204 usable for localization. Further, the reference signal 201 may also be provided to the quality determiner 230 which may asses the quality of the received reference signal 210, e.g. if it is subject to multipath propagation or a signal-to-noise ratio.

Figure 3:
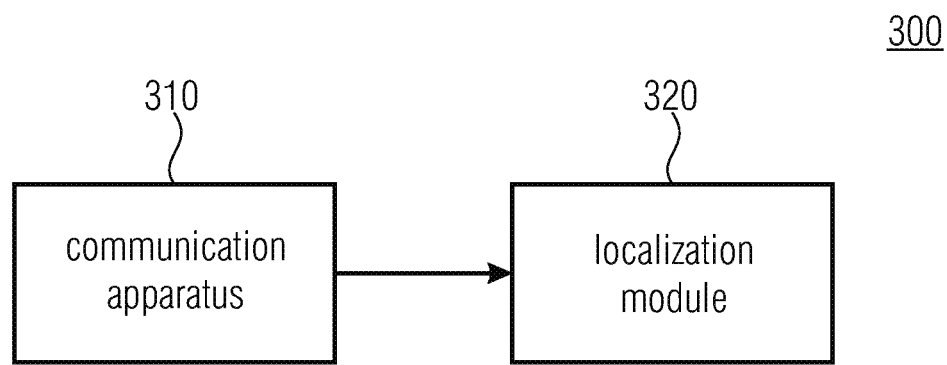
FIG. 3 shows a schematic block diagram of cellular network according to embodiments of the invention.

FIG. 3 shows a schematic block diagram of cellular network 300 according to embodiments of the invention. The cellular network 300 comprises a communication apparatus 310 and a localization module 320. The communication apparatus 310 may be one of the communication apparatus according to FIG. 1 or FIG. 2.

Figure 4:
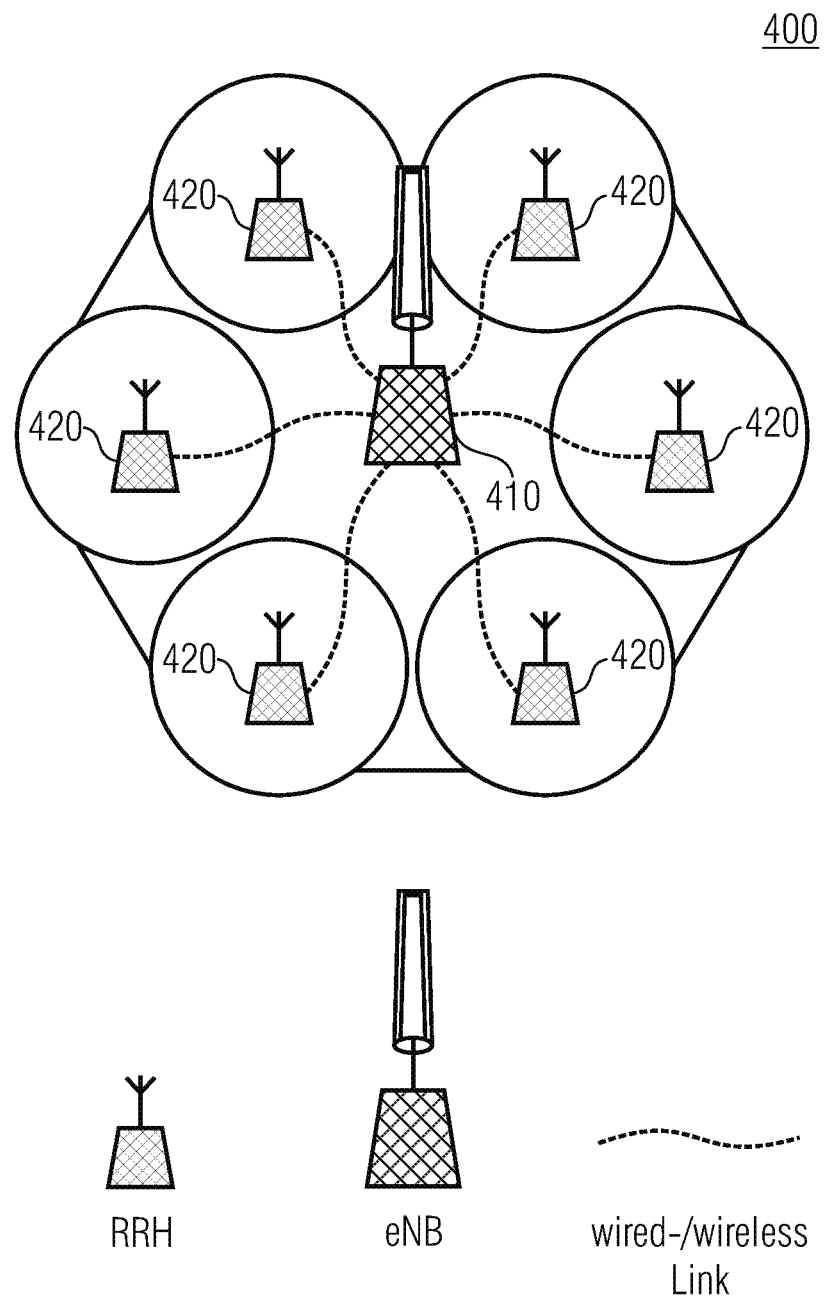
FIG. 4 shows an illustration of synchronized transmitters.

FIG. 4 shows an illustration of synchronized transmitters 400. In other words, FIG. 1 shows a cell with multiple remote radio heads/transmission points [1]. The synchronized transmitters 400 comprise a base station 410 (extended NodeB, eNB), which is connected through a wired or wireless link to remote radio heads 420 (RRH) which act as extension of the base station 410. Through the link a high degree of synchronization can be achieved which is especially useful for phase-based localization, i.e. when receiving reference signals from multiple remote radio heads 420 and using them for phase-based localization.

Figure 5:
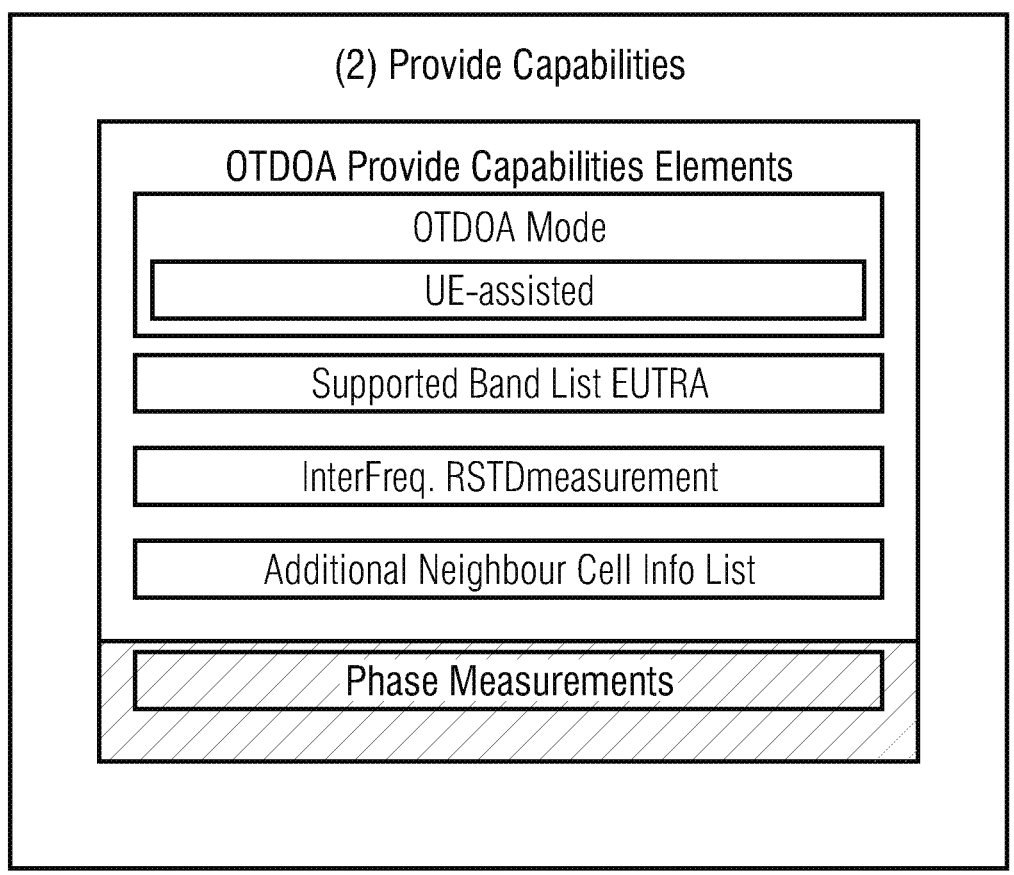
FIG. 5 shows a data structure used for signaling capabilities of a communication apparatus according to embodiments of the invention.

FIG. 5 shows a data structure 500 used for signaling capabilities of a communication apparatus according to embodiments of the invention. The data structure 500 comprises a field labeled phase measurements which can be set as active, to indicate to another communication apparatus (e.g., a base station) that the device is able to perform phase measurements and, thereby, determine the phase estimate or multiple phase estimates.

Figure 6:
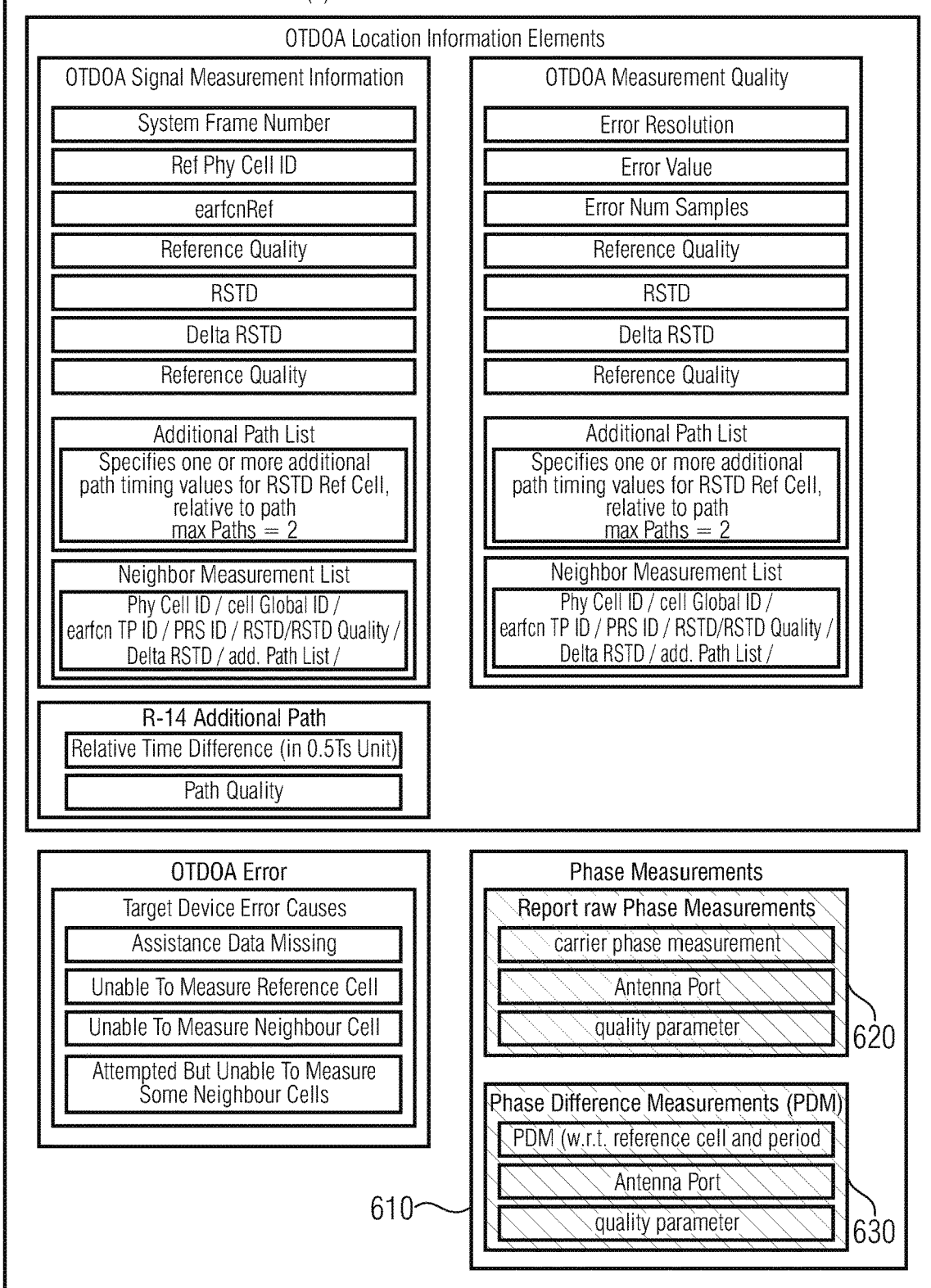
FIG. 6 shows an OTDOA location information structure according to embodiments of the invention.

FIG. 6 shows an OTDOA location information structure 600 according to embodiments of the invention. In other words, FIG. 6 shows Phase measurement as an additional part of OTDOA Location Information Elements from [7]. The structure 600 may be provided by a communication apparatus (e.g. apparatus 100, 200 or 310) according to embodiments to a localization module (e.g. localization module 120 or 320). The data structure 600 comprises a data structure 610 for phase measurements. It can comprise raw phase measurement data 620 and/or phase difference measurement data 630. The raw phase measurement data 620 may comprise a carrier phase measurement, antenna port information and/or a quality parameter. The phase difference measurement data 620 may comprise a phase difference measurement (with respect to reference cell and period), antenna port information and/or a quality parameter. Based on the data structure 600 a localization can be performed e.g. by the localization module.

Figure 7:
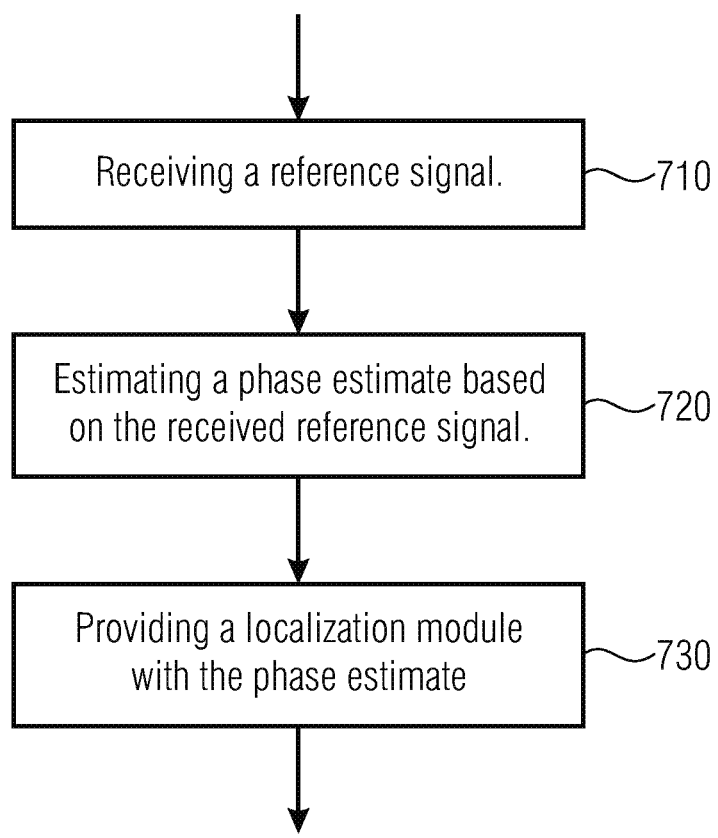
FIG. 7 shows a flow chart of a method according to embodiments of the invention.

FIG. 7 shows a flow chart of a method 700 according to embodiments of the invention. The method comprises receiving 700 of a reference signal, estimating 720 a phase estimate based on the received reference signal and providing 730 a localization module with the phase estimate. The described method can be supplemented by any of the features and functionalities described herein with respect to apparatus, individually or in combination.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

Further Aspects

In the following additional features will be described which can be optionally included in any of the above described embodiments.

In conventional concepts GNSS (Global Navigation Satellite System) enhance their position accuracy by not just doing pseudorange measurements (equivalent to TOA), but also doing carrier phase measurements. Phase ambiguities (between satellites and terminals) that naturally arise if you measure phase that repeats every wavelength are resolved by algorithmic approaches like Real Time Kinematic (RTK) or Precise Point Positioning (PPP).

Like explained in Reference [6], carrier phase measurements are as well employed in terrestrial positioning systems. In the case of [6], carrier phase ambiguities are not resolved. Here, carrier phase is used to describe relative movements and effectively smooths trajectories that would be noisy if based on TOA only.

In the following aspects underlying embodiments are listed
- Use carrier phase measurement which can achieve in GNSS systems accuracies in the cm range [2]
- Much smaller distance between BS and mobile receiver helps compared to GNSS systems
- Distance between receiver and BS may be measured by counting the number of carrier cycles and multiplying them with the carrier wavelength
- Carrier phase measurement may also be used to smooth trajectories and to improve the determination of relative movement.

The carrier phase measurement may be more precise than the code measurement (time measurement). The carrier phase represents the phase difference between the internally generated carrier signal and the received signal at the measurement time. The measurement is more precise but ambiguous which means that it cannot be used directly for TOA estimation as the code measurements. The carrier phase measurement Ø can be expressed by:

$$\emptyset = \frac{d}{\lambda} + \frac{c \cdot (t_{bias\_Rx} - t_{bias\_Tx})}{\lambda} + N + \varepsilon \quad (1)$$

where d is the range between a transmitter and a receiver, λ is the wavelength, Δt is the difference for the bias of the receiver and transmitter clock, N is the integer ambiguity and ε represents the measurement error.

In the following smoothing of TOA using phase measurements according to embodiments is discussed.

An approach is to take advantage of the phase measurements without the need to resolve the ambiguity by relating the change in the phase measurement over a time interval to the code measurement. This approach is known as carrier-smoothing and is commonly used in some GPS receivers or in terrestrial specialized positioning systems like [6]. It allows for accurate tracking of relative movements. If the carrier is tracked between two time epochs then N can be dropped.

$$\Delta \emptyset_{t1,t2} = \lambda^{-1}(d_{t1} - d_{t2}) + \lambda^{-1} \cdot c \cdot \Delta t + \Delta \varepsilon \quad (2)$$

For a TDOA system:

$$\nabla \Delta \emptyset = \lambda^{-1}(d_{ref} - d_{eNBx}) + \lambda^{-1} \cdot c \cdot \Delta t + \Delta \varepsilon \quad (3)$$

In the following it is discussed how to resolve ambiguities in phase measurements to smooth TOA.

To allow for accurate absolute positioning using carrier phase measurements, the ambiguities described above need to be resolved. This can be achieved, e.g. using the LAMBDA method [3], but it a phase coherent transmission of the reference signals from multiple sites is helpful therefore. Alternatively, the phase bias may be accurately known or determined by using a reference receiver at a known location.

This can be realized, e.g. by using small cells or other fixed transmit/receive points (TRPs) where the location is known In the following a special scenario for carrier phase measurements with remote radio heads and distributed antenna systems is discussed, see FIG. 4.

In a setup (FIG. 4), where eNBs are installed at different sites, phase coherent transmission can hardly be assumed. However, in a setup with multiple remote radio heads (RRHs), Transmission Points (TPs), or with a distributed antenna system, fully coherent transmission can be achieved.

To make use of fully coherent transmission for positioning, signaling to the UE, which performs carrier phase measurements may be helpful:
 If a UE has received a set of OTDOA assistance data:
  If #TPs associated to single PCI>1:
   If coherent-tp:
    Enable support for carrier phase-based positioning for all TPs associated to a single PCI else:
  No support for carrier-phase based positioning for TPs associated to PCI In other words:

First of all, a UE receives OTDOA assistance data for each PRS configuration

PRS can be configured for a single PCI. However, if multiple TPs are associated with a single PCI, multiple PRS configurations may be signaled to the UE One or multiple TPs are associated with a single PCI If multiple TPs are associated, coherent transmission from all TPs may be realized If coherent transmission is actually performed, carrier phase measurements can be performed and the results can be signaled to the network In the following LPP (LTE positioning protocol) signaling and implementation relevant aspects are discussed.

New value send from UE to BS, BS to UE, BS to location server (number of cycles)

For the phase measurement signals at predefined locations in the time-frequency grid can be used, e.g.

Probably most suited are Position reference signals (PRS) which are spread in time and frequency Primary or secondary synchronization signals (PSS, SSS in [4][5])

Cell-specific reference signals (CRS), e.g. R0 or R1 as defined in [4]

CSI reference signals

Synchronization/reference signals are processed through correlation to the known sequence. Normally, a time value is obtained from this processing step (for the initial purposes of time synchronization or RSTD measurement), but any complex sequence delivers as well a complex correlation curve. The phase of the complex correlation peak is equivalent to the carrier phase.

Correction values may be important (to derive errors from atmospheric condition)

Correction values can be derived by signals send from BS to BS (close to the UE), where the BS (and distance) is known Correction values have to be transmitted to the node doing the measurement of the carrier phase counting In the following LPP signaling for phase smoothing is discussed.

Messages helpful for carrier smoothing in downlink:

UE to Server provide capabilities: phase measurement flag added see FIG. 5

Server to UE (Assistance data)

No extra signaling may be involved (it is assumed that eNB reports the antenna port for PRS)

UE to server (location server)

In addition to the carrier phase measurement, the UE may report which antenna port was used for the measurement. A quality parameter for the phase measurement is optional but it could be useful to the location server to recognize how much to depend on the phase measurement:

Carrier phase raw (see Eq. 1)

or Carrier phase difference double differences (see Eq. 2 and 3)

In the following LPP signaling for RRH scenario is discussed.

OTDOA assistance data from BS to UE for PRS configuration

Antenna port to PRS sequence mapping

Mapping of PRS sequence into time-frequency resource grid

Measurement from UE to BS (similar to LPP signaling for phase ambiguity resolution)

In the following LPP signaling for phase ambiguity resolution is discussed.

In the example in FIG. 6, the phase measurement is shown as an additional part of the OTDOA Location Information Elements from [7], which includes the two options as already described above:

1. Raw phase measurement
2. Phase difference measurement (PDM)

Independent of option 1 or 2 the report may include the antenna port and a quality parameter (to be defined) the different part is:

1. For raw measurement the direct carrier phase measurement
2. The PDM with respect to the reference signal and period In the following aspects of the invention are given as a list.

1. Use carrier phase-measurement for positioning in cellular communications networks, e.g. such as LTE, 5G (New Radio), WiFi or similar networks
2. Signaling of carrier phase measurement capability from device to network (BS) in cellular communications network (e.g. additional flag in OTDoA Provide Capabilities Element)
3. Reporting of carrier phase measurements, e.g. as part of location information elements in LTE
   1. Report of raw phase measurement and the antenna port (if not fixed by the frame-structure) and optional a quality parameter
   2. Report of phase difference measurements (PDM) (if not fixed by frame structure or protocol, reference to an cell, period and antenna port is also signaled, and optional a quality parameter
4. Use small cells (or similar) with known position in close proximity to UE for reference measurement to resolve ambiguities
   1. Also used as an atmospheric correction value for phase or phase difference measurement (similar to reference ground stations in GNSS)

Embodiments provide an increase of accuracy in an optimal case from 10 m to cm-range. Further, embodiments signal carrier phase measurements from a UE to a network. Embodiments are services that need (accurate) position information. Moreover, embodiments describe a method to improve positioning in mobile communication networks. Embodiments describe usage of carrier phase for positioning in mobile communication networks.

LIST OF ACRONYMS AND SYMBOLS

BS Base station
DoA Direction of arrival
eNB Enhanced
GNSS Global Navigation Satellite System
LTE Long Term Evolution
OTDoA Observe Time Difference of Arrival
PCI Primary Cell Identifier
PRS Position Reference Signal
RSTD Reference Signal Time Difference
TOA Time of Arrival
TP Transmission Point
TRP Transmission/Reception Point
UTDoA Uplink Time Difference of Arrival
UE User Equipment

REFERENCES

[1] S. Fischer, "Observed Time Difference Of Arrival (OTDOA) positioning in 3GPP LTE", Qualcomm White Pap, vol. 1, pp. 1-62, June 2014 Second
[2] P. Misra, P. Enge, "Global Positioning System: Signals, Measurements, and Performance", (Revised Second Edition) Ganga-Jamuna Press, 2010
[3] G. Giorgi and P. J. G. Teunissen, "Carrier phase GNSS attitude determination with the Multivariate Constrained LAMBDA method," 2010 IEEE Aerospace Conference, Big Sky, Mont., 2010, pp. 1-12.
[4] Technical Specification 36.211 3GPP Physical Channels and Modulation 3rd Generation Partnership Project, 3rd Generation Partnership Project, 2016, V13.0.0
[5] Technical Specification 36.355 3GPP LTE Positioning Protocol (LPP) (Release 13) 3rd Generation Partnership Project, 3rd Generation Partnership Project, 2016
[6] T. von der Gain, N. Franke, D. Wolf, N. Witt and A. Eidloth, "A real-time tracking system for football match and training analysis," in Microelectronic systems, Springer, 2011, pp. 199-212.
[7] Access, Evolved Universal Terrestrial Radio. "LTE Positioning Protocol (LPP)." 3GPP TS 36 (2013).

The invention claimed is:

1. Communication apparatus of a cellular communication network,
    wherein the communication apparatus is part of a user equipment of the cellular communication network,
    wherein the communication apparatus comprises a microprocessor or a programmable computer or an electronic circuit, which is configured to
        receive a reference signal;
        estimate a phase estimate based on the received reference signal; and
        provide a localization module with the phase estimate;
    wherein the microprocessor or the programmable computer or the electronic circuit is configured to
        receive a plurality of reference signals from a plurality of transmitters and to
        estimate a plurality of phase estimates from the plurality of reference signals, and to
    receive from the plurality of transmitters synchronicity information indicating a measure of synchronicity among the plurality of transmitters and,
    if the synchronicity measure fulfills a predetermined criterion,
        perform the estimation and provide the plurality of phase estimates to the localization module and,
    if the synchronicity measure does not fulfill the predetermined criterion,
        refrain from at least the providing the plurality of phase estimates to the localization module.

2. Communication apparatus according to claim 1, wherein the communication apparatus is configured to transmit a phase estimate capability flag to the cellular communication network, wherein the phase estimate capability flag indicates that the communication apparatus is capable of performing a phase estimate.

3. Communication apparatus according to claim 1, wherein the communication apparatus comprises the localization module, and wherein the localization module is configured to determine a position of the user equipment.

4. Communication apparatus according to claim 1, wherein the communication apparatus is configured to communicate via LTE positioning protocol, LPP, the phase estimate to the localization module for use in determination of the position of the user equipment.

5. The communication apparatus according to claim 4, wherein the communication apparatus is configured to transmit antenna port information of the communication apparatus to a base station, wherein the antenna port information indicates which antenna is used to receive the reference signal.

6. Communication apparatus according to claim wherein the communication apparatus is configured to
    receive a plurality of reference signals from a plurality of transmitters and to
    estimate a plurality of phase estimates from the plurality of reference signals, and to
    receive from the plurality of transmitters synchronicity information indicating a measure of synchronicity among the plurality of transmitters and,
    if the synchronicity measure fulfills a predetermined criterion,
        perform the estimation and provide the plurality of phase estimates to the localization module and,
    if the synchronicity measure does not fulfill the predetermined criterion,
        refrain from at least the providing the plurality of phase estimates to the localization module.

7. Communication apparatus according to claim 6, wherein the communication apparatus is configured to
    derive a plurality of time measurements from the reference signals or further reference signals from the plurality of transmitters and to,
    if the synchronicity measure fulfills the predetermined criterion,
        provide the plurality of time measurements in addition to the plurality of phase estimates to the localization module and,
    if the synchronicity measure does not fulfill the predetermined criterion,
        provide the plurality of time measurements to the localization module.

8. Communication apparatus according to claim 7, wherein the communication apparatus is configured to,
    if the synchronicity measure fulfills the predetermined criterion,
        determine a quality measure according to a first mode and accompany the plurality of phase estimates and the time measurement with the quality measure, and
    if the synchronicity measure does not fulfill the predetermined criterion,
        determine the quality measure according to a second mode differing from the first mode and
        accompany the plurality of time measurements with the quality measure.

9. Communication apparatus according to claim 2, wherein the localization module is configured to selectively enable phase estimate-based localization if two or more reference signals are received from a number of synchronized transmission points.

10. Communication apparatus according to claim 1, wherein the communication apparatus is part of a base station of the cellular communication network, and wherein the communication apparatus is configured to receive the reference signal from a user equipment of the cellular communication network.

11. Communication apparatus according to claim 10, wherein the communication apparatus comprises the localization module, and wherein the localization module is configured to determine a position of the user equipment using the phase estimate, or wherein the localization module resides outside of the communication apparatus and the communication apparatus is configured to communicate the phase estimate to the localization module for use in the determination of the position of the user equipment.

12. Communication apparatus according to claim 10, wherein the user equipment comprises the localization module, and wherein the communication apparatus is configured to provide the localization module of the user equipment with the phase estimate for use in the determination of the position of the user equipment.

13. Communication apparatus according to claim 6, wherein the communication apparatus is configured to receive antenna port information, wherein the antenna port information indicates from which antenna of transmitter the reference signal is transmitted.

14. Communication apparatus according to claim 1, wherein the communication apparatus is configured to receive a second reference signal;
wherein the communication apparatus is configured to estimate a second phase estimate based on the second reference signal; and
wherein the communication apparatus is configured to provide the localization module with the second phase estimate.

15. Communication apparatus according to claim 14, wherein the second reference signal is transmitted from a different transmitter than the reference signal.

16. Communication apparatus according to claim wherein the apparatus is configured to estimate a time measurement based on the received reference signal,
wherein the apparatus is configured to provide the localization module with the time measurement, and
wherein the localization module is configured to determine a position using the phase estimate and the time measurement.

17. Communication apparatus according to claim 1, wherein the localization module is configured to determine the position by combining at least one of time difference of arrival measurement, time of arrival measurement and angle of arrival measurement with the phase estimate.

18. Communication apparatus according to claim 1, wherein the communication apparatus is configured to receive a plurality of reference signals from a plurality of transmitters and to estimate a plurality of phase estimates from the plurality of reference signals, and wherein the communication apparatus is configured to derive a plurality of time measurements from the reference signals or further reference signals from the plurality of transmitters, and wherein the communication apparatus is configured to
provide the plurality of time measurements in addition to the plurality of phase estimates to the localization module,
determine a first quality measure indicating a quality of the plurality of phase estimates and a second quality measure indicating a quality of the plurality of time measurements and
accompany the plurality of phase estimates and time measurements with the first and second quality measures.

19. Communication apparatus according to claim 1, wherein the communication apparatus is configured to
receive a plurality of reference signals from a plurality of transmitters and to
estimate a plurality of phase estimates from the plurality of reference signals, to derive a plurality of time measurements from the reference signals or further reference signals from the plurality of transmitters, and to
provide the plurality of time measurements in addition to the plurality of phase estimates to the localization module,
wherein the localization module is configured to determine the position by applying the plurality of phase estimates as phase differences between pairs of the plurality of transmitters.

20. Communication apparatus according to claim 1, wherein the communication apparatus is configured to receive observed time difference of arrival assistance data associated with a reference signal configuration.

21. Communication apparatus according to claim 1, wherein the communication apparatus is configured to determine a measure indicating as to how strong the received reference signal is subject to multipath propagation, wherein the communication apparatus is configured to accompany the phase estimate with the multipath measure.

22. Communication apparatus according to claim 1, wherein the apparatus is configured to estimate the phase estimate using a prediction of the phase estimate, wherein the prediction is based on previously estimated phase estimates.

23. Communication apparatus according to claim 1, wherein the communication apparatus is configured to transmit a quality indicator to a base station, wherein the quality indicator describes a quality of the phase estimate.

24. Communication apparatus according to claim 1, wherein the communication apparatus is configured to provide a phase difference estimate based on a previous phase estimate and the received reference signal.

25. Communication apparatus according to claim 1, wherein the communication apparatus is configured to provide observed time difference of arrival (OTDOA) location information elements, wherein the OTDOA location information elements comprise the phase estimate, and/or antenna port information, and/or a quality indicator, and/or a time measurement.

26. Cellular network comprising:
a communication apparatus according to claim 1, and
the localization module.

27. Communication apparatus according to claim 1, wherein the communication apparatus is configured to
derive a plurality of time measurements from the reference signals or further reference signals from the plurality of transmitters and to,
if the synchronicity measure fulfills the predetermined criterion,
provide the plurality of time measurements in addition to the plurality of phase estimates to the localization module and,
if the synchronicity measure does not fulfill the predetermined criterion,
provide the plurality of time measurements to the localization module.

28. Communication apparatus according to claim 27, wherein the communication apparatus is configured to,
if the synchronicity measure fulfills the predetermined criterion,
determine a quality measure according to a first mode and accompany the plurality of phase estimates and the time measurement with the quality measure, and
if the synchronicity measure does not fulfill the predetermined criterion, determine the quality measure according to a second mode differing from the first mode and accompany the plurality of time measurements with the quality measure.

29. Communication apparatus according to claim 1, wherein the communication apparatus is configured to receive antenna port information, wherein the antenna port information indicates from which antenna of transmitter the reference signal is transmitted.

* * * * *